(12) United States Patent
Simon et al.

(10) Patent No.: US 8,681,526 B2
(45) Date of Patent: Mar. 25, 2014

(54) SIZE AND RETRY PROGRAMMABLE MULTI-SYNCHRONOUS FIFO

(75) Inventors: Moshe B. Simon, San Ramon, CA (US);
Erik P. Machnicki, San Jose, CA (US);
Mark Longley, Livermore, CA (US)

(73) Assignee: Cradle IP, LLC, Mountain View, CA (US)

( * ) Notice: Subject to any disclaimer, the term of this patent is extended or adjusted under 35 U.S.C. 154(b) by 703 days.

(21) Appl. No.: 12/167,064

(22) Filed: Jul. 2, 2008

(65) Prior Publication Data
US 2010/0005250 A1  Jan. 7, 2010

(51) Int. Cl.
*G11C 19/00* (2006.01)
(52) U.S. Cl.
USPC ................................. 365/78; 710/52; 711/154
(58) Field of Classification Search
USPC .................. 365/78; 710/52; 711/154
See application file for complete search history.

(56) References Cited

U.S. PATENT DOCUMENTS

| | | | |
|---|---|---|---|
| 4,750,149 A | 6/1988 | Miller | |
| 4,873,666 A | 10/1989 | Lefebvre et al. | |
| 5,079,693 A | 1/1992 | Miller | |
| 5,278,956 A | 1/1994 | Thomsen et al. | |
| 6,269,413 B1 | 7/2001 | Sherlock | |
| 6,434,676 B1 | 8/2002 | Perloff | |
| 6,438,102 B1 * | 8/2002 | Chui et al. | 370/229 |
| 6,442,657 B1 | 8/2002 | Fan et al. | |
| 6,578,104 B1 | 6/2003 | Small et al. | |
| 6,986,004 B1 | 1/2006 | Cheng et al. | |
| 7,106,098 B1 | 9/2006 | Zack et al. | |
| 7,746,871 B2 * | 6/2010 | Kim | 370/395.7 |
| 2001/0054121 A1 * | 12/2001 | Proch et al. | 710/57 |
| 2003/0141897 A1 * | 7/2003 | Bentz | 326/38 |
| 2004/0131055 A1 * | 7/2004 | Calderon et al. | 370/381 |
| 2005/0041450 A1 * | 2/2005 | Duh et al. | 365/1 |
| 2005/0080610 A1 * | 4/2005 | Toma et al. | 703/22 |
| 2007/0153786 A1 * | 7/2007 | Kim | 370/389 |
| 2007/0168583 A1 * | 7/2007 | Kim | 710/56 |
| 2008/0126602 A1 * | 5/2008 | Biran et al. | 710/22 |

\* cited by examiner

*Primary Examiner* — Hong Kim
(74) *Attorney, Agent, or Firm* — Thomas Schneck; Mark Protsik

(57) ABSTRACT

A size and retry programmable multi-synchronous FIFO. In one embodiment, a multi-synchronous FIFO memory generally comprises a selectable number of addressable memory locations for storing information; read control means synchronized by a read clock for controlling pop transactions configured to read from one or more of the selected number of addressable memory locations; write control means synchronized by a write clock asynchronous to the read clock for controlling push transactions to write to one or more of the selected number of addressable memory locations; and selectable transaction retry control means configured to cause read control means to repeat selected pop transactions and/or cause write control means to repeat selected push transactions. In another embodiment a method of retrying a transaction in a multi-synchronous FIFO having a selectable number of addressable memory locations generally comprises the steps of receiving a transaction request; storing the starting address of the transaction register in a start register; executing the transaction; incrementing the starting address in the transaction register after comparing the incremented address to the selected number of addressable memory locations; receiving a retry request; and retrying the transaction.

19 Claims, 4 Drawing Sheets

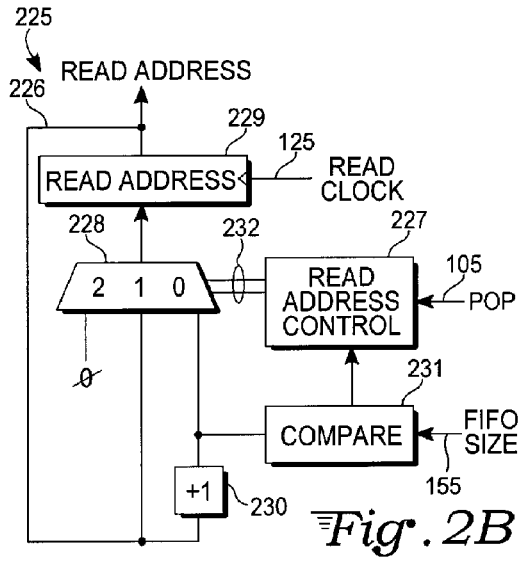
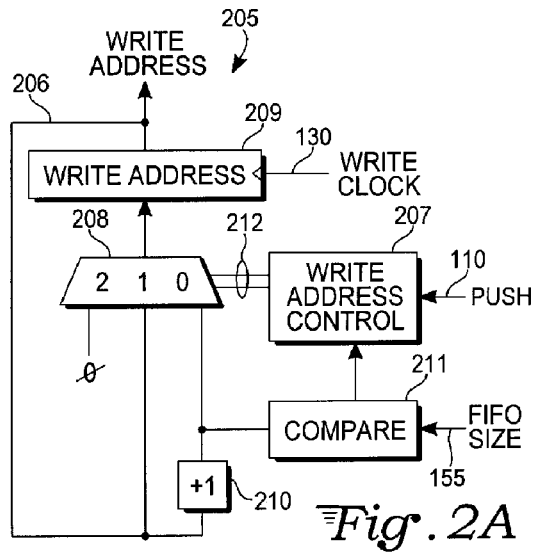
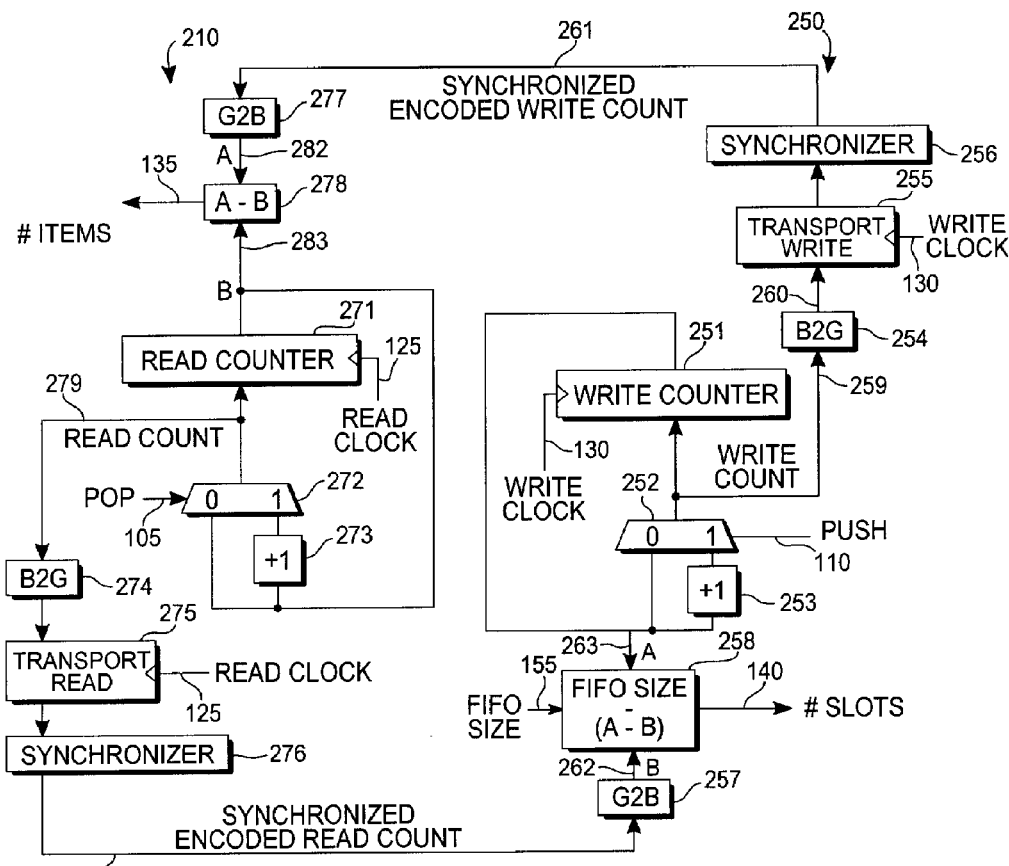

SIZE AND RETRY PROGRAMMABLE MULTI-SYNCHRONOUS FIFO

TECHNICAL FIELD

The present invention generally relates to the field of FIFO (i.e., First In First Out) memories. More specifically, embodiments of the present invention pertain to circuits, architectures, systems, methods and algorithms for configuring and controlling multi-synchronous FIFO memories.

BACKGROUND

FIFO memories comprise addressable memory cells such as RAM (i.e., Random Access Memory) and memory access (e.g. read and write) control circuitry. Information (e.g., data, addresses, instructions) may be written to and read from the memory cells using the control circuitry. FIFO control circuitry relies on basic FIFO status information such as a read address pointer and a write address pointer to accurately keep track of which memory cells are due to be read and written, respectively, in accordance with first-in first-out functionality. Read and write functions are mutually dependent on read and write pointers. For instance, if a memory cell has been written but not yet read (as would be the case if the FIFO were full of unaccessed information) then it is not yet due to be written. Likewise, if a memory cell has previously been written and read but not subsequently written (as would be the case if the FIFO were "empty") then it is not yet due to be read. If read and write functions were not made to be mutually dependent on FIFO status information such as read and write pointers then an undesirable underrun (i.e., overread) or overrun (i.e., overwrite) condition may occur.

In a synchronous FIFO memory the same clock is used to write to and read from the memory cells in the FIFO. In an asynchronous (e.g., multi-synchronous) FIFO memory, writes to and reads from the FIFO are not synchronized in a single clock domain. Multi-synchronous FIFO memories are utilized to allow independently clocked systems to communicate with one another by acting as a buffer between the systems. Even though reads and writes may occur independently in time in multi-synchronous FIFO memories, they remain mutually dependent on FIFO status information such as read address and write address pointers. Because of this mutual dependence on the same status information, the status information must be made available in each independent asynchronous time domain. Passing multiple FIFO status signals between asynchronous time domains naturally results in added complexity for functions performed by asynchronous FIFO memories, relative to more simplistic synchronous FIFOs.

Because FIFO memories generally comprise an array of addressable memory cells arranged as rows and columns, read address and write address pointers generally require several bits to address individual memory cells or groups (e.g., rows) of memory cells such as a row of 16 memory cells storing a 16-bit word of information. Each address bit is a signal unto itself. For example, if a FIFO has eight rows for storing eight 16-bit words, the read pointer would require three address bits and the write pointer would require and additional three address bits for a total of six signals that must be passed between asynchronous time domains. Larger FIFO memories increase the number of signals, which only increases timing complexity.

Techniques to simplify timing requirements for signals passed between asynchronous domains include Gray coding. For example, if an address pointer increments, e.g., after a read or write, from row 7 (i.e., binary 111) to row 0 (i.e., binary 000), all three signals for the address pointer change. Popping and pushing involve increments by one of the address pointer. By encoding the binary address using Gray coding, only one bit changes per increment of an address pointer, and that at most one bit can be changing at the instant that the pointer is parted across the clock domain. The value that is ported is either the Gray-coded value before the lo increment or the Gray-coded value after the increment. Retry changes the pointer value by an arbitrary amount. In that case, the Gray-code encoding would change is several bit positions. The Gray-code encoded value would not be portable across clock domains, were the change in pointer value to occur in one clock cycle. By spreading out the change in pointer value that retry causes across multiple cycles, such that the pointer value changes by at most 1 from cycle to cycle, the Gray-coded pointer value becomes portable at all times.

U.S. Pat. No. 5,278,956 describes a synchronous FIFO (one clock domain) with variable depth and variable threshold for defining the fall/empty conditions in the FIFO.

U.S. Pat. Nos. 4,873,666 and 5,079,693 describes retry (re-read and rewrite) mechanisms on both read and write sides of a synchronous FIFO, using temporary registers to hold copies of respective read and write counters. There is one clock domain, U.S. Pat. No. 6,434,676 describes a generalization of a re-read mechanism, allowing multiple re-reads at random locations. Again, there is one clock domain and the FIFO is synchronous.

Due to timing complexities, multi-synchronous FIFO memories are generally fixed in size and lack functionality. Given that size requirements for multi-synchronous FIFO memories vary from one design to the next and given that not every read or write transaction is successful, it would be advantageous to overcome the timing complexities to develop a multi-synchronous FIFO having programmable size and transaction retry capability, and a single Gray-code encode/decode and synchronization circuit that is fixed and works for all FIFO sizes.

SUMMARY

Embodiments of the present invention relate to circuitry, architectures, systems, methods and algorithms for configuring and controlling multi-synchronous FIFO memories. A multi-synchronous FIFO memory generally is comprises: a selectable number of addressable memory locations for storing information; read control means synchronized by a read clock for controlling pop transactions configured to read from one or more of the selected number of addressable memory locations; write control means synchronized by a write clock asynchronous to the read clock for controlling push transactions to write to one or more of the selected number of addressable memory locations; and selectable transaction retry control means configured to cause read control means to repeat selected pop transactions and/or cause write control means to repeat selected push transactions.

A method of retrying a transaction in a multi-synchronous FIFO having a selectable number of addressable memory locations generally comprises the steps of receiving a transaction request; storing the starting address of the transaction register in a start register; executing the transaction; incrementing the starting address in the transaction register after comparing the incremented address to the selected number of addressable memory locations; receiving a retry request; and retrying the transaction.

The present invention advantageously provides flexibility for numerous implementations of a generic multi-synchronous FIFO. FIFO size can be programmed incrementally up to the maximum number of addressable memory locations of the FIFO. The same Gray code encoder and decoder operate on the range of FIFO sizes. Transactions may be retried without loss of information or corruption of FIFO state even though push and pop clock domains are asynchronous. Retried transactions may be started in the same cycle in which retry is asserted and subsequent transactions may be started in the same cycle in which success is asserted for the previous transaction. Back to back successful and retried transactions can be performed without delays. Retry capability may be turned on or off. These and other advantages of the present invention will become readily apparent from the detailed description of preferred embodiments below.

BRIEF DESCRIPTION OF THE DRAWINGS

FIGS. 2A-C are block diagrams illustrating an exemplary implementation of a programmable size FIFO embodiment of the present invention.

DETAILED DESCRIPTION

Figure 1:
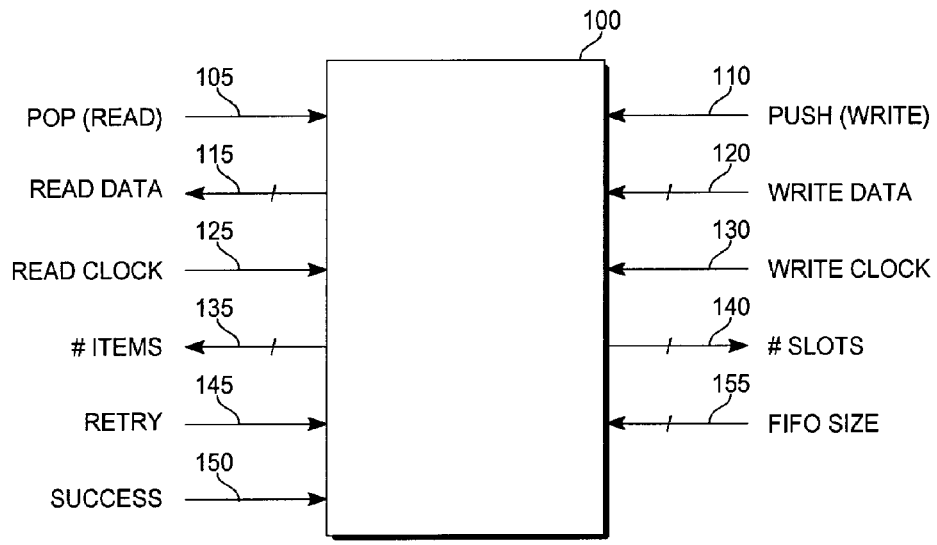
FIG. 1 is a block diagram illustrating an embodiment of a size and retry programmable multi-synchronous FIFO in accordance with the present invention.

With reference to FIG. 1, an exemplary embodiment of a size and retry programmable multi-synchronous FIFO memory (hereinafter FIFO) 100 in accordance with the present invention shows exemplary input and output signals of the FIFO 100. Although not shown in FIG. 1, it will be understood that FIFO 100 comprises addressable memory cells and memory access control circuitry, which is illustrated in and discussed with reference to FIGS. 2 and 3. FIFO 100 receives or generates the following signals: pop input 105, push input 110, read data output 115, write data input 120, read clock 125, write clock 130, output #items 135, output #slots 140, retry input 145, success input 150 and FIFO size input 155.

Pop input 105 is asserted to read information stored in memory cells addressed by read address pointer 22G, as shown in FIG. 2B. Following assertion of pop input 105, information stored in memory cells addressed by read address pointer 226 is output on the several data lines of read data output 115 and read address pointer is incremented to the next memory address location. Each pop (i.e., read) is synchronized with read clock 125. Read transactions may involve more than one pop, i.e., pop input 105 may be asserted over more than one cycle of read clock 125 to carry out consecutive pops.

Push input 110 is asserted to write information to memory cells addressed by write address pointer 206, as shown in FIG. 2A. Following assertion of push input 110, information made available on write data input 120 is written to (i.e., stored in) memory cells addressed by write address pointer 206 and then write address pointer 206 is incremented to the next memory address location. Each push (i.e., write) is synchronized with write clock 130. Write transactions may involve more than one push, i.e., push input 110 may be asserted over more than one cycle of write clock 130 to carry out consecutive pushes.

Pop input 105 and push input 110 may be asserted independently, including simultaneously. Simultaneous reading and writing to the same memory cells is prohibited. Read clock 125 is independent of an asynchronous to write clock 130. Output #items 135 and is output #slots 140 are status indicators that report the status (i.e., state) of FIFO 100 and, specifically, the number of addressable memory locations available for pop and push transactions. Output #items 135 reports the number of memory cells or groups (e.g., rows) of memory cells that currently store information that has not yet been read. Output #items 135 is synchronized with read clock 125. Output #slots 140 reports the number of memory cells or groups of memory cells that are currently available to store information either because they have not yet been written to or because they have been written to and read out. Output #slots 140 is synchronized with write clock 130. If there are $2^n$ addressable memory locations (i.e., cells or groups of memory cells), then each of output #items 135 and output #slots 140 are n+1 bits. For example, where n=3, there are eight (8) addressable memory locations and each of output #items 135 and output #slots 140 are specified by four (4) bits. In other embodiments, each of output #items 135 and output #slots 140 may consist of n bits, which is the precise number of bits required to address $2^n$ addressable memory locations. In some embodiments, external circuitry must prevent assertion of pop input 105 when output #items 135 indicates FIFO 100 is empty (i.e., when output #items 135=zero) and must prevent assertion of push input 110 when output #slots 140 indicates FIFO 100 is full (i.e., when output #slots 140=zero).

FIFO size input 155 is asserted to program the size, i.e., number of addressable memory locations, of FIFO 100. If there are a maximum of $2^n$ addressable memory locations in FIFO 100, then FIFO size input 155 has n+1 bits. In other embodiments, FIFO size input 155 may consist of n bits, which is the precise number of bits required to address the maximum number of $2^n$ addressable memory locations. FIFO size input 155 may specify the size of FIFO 100 in increments of one memory location up to the maximum number of addressable memory locations in FIFO 100. The size of FIFO 100 is statically variable or fixed for each implementation of FIFO 100. In other embodiments the size of FIFO 100 may be dynamically variable.

Retry input 145 and success input 150 are asserted by external circuitry to request transaction retry or indicate a successful transaction, respectively. Retry input 145 and success input 150 are synchronized with read clock 125. External circuitry (not shown) may assert pop input 105 one or more times (i.e., over one or more cycles of read clock 125) to read information stored in one or more memory locations in FIFO 100. If the read transaction fails for some reason, the external circuitry may assert retry input 145 for one clock cycle. As shown in and discussed with reference to FIG. 5, assertion of retry input 145 restores the read-side of FIFO 100 to the state that existed immediately prior to the start of the failed transaction. Simultaneous assertion of retry input 145 and pop input 105 allows the failed transaction to retry in the same cycle of read clock 125. If a read transaction was successful, the external circuitry asserts success input 150 for one cycle of read clock 125. Simultaneous assertion of success input 150 and pop input 105 allows a new transaction to begin in the same cycle of read clock 125. Thus, back-to-back successful and retried transactions can be performed by FIFO 100 without lost cycles. External circuitry may turn transaction retry capability off by asserting success input 150 and deasserting retry input 145. This allows external circuitry to statically or dynamically program transaction retry capability. When transaction retry capability is in use, external circuitry is responsible for asserting only one or the other of retry input 145 and success input 150, but not both simultaneously. The net result is that transactions of various sizes can be retried without loss of data or corruption of FIFO state even though pop and push domains are different.

FIGS. 2A-C are block diagrams illustrating an exemplary implementation of memory access control circuitry for a programmable size and programmable retry FIFO embodiment in accord with the present invention. The access control circuitry for a multi-synchronous FIFO 100 comprises three functional blocks, including a standard write address pointer block 205 shown in FIG. 2A, a standard read address pointer block 225 shown in FIG. 2B and multi-synchronous block 245 shown in FIG. 2C.

With reference to FIG. 2A, a standard write address pointer block 205 receives and utilizes, with reference to FIG. 1, push input 110, write clock 130 and FIFO size input 155 to generate internal write address 206. Assuming there are a maximum of $2^n$ addressable memory locations in FIFO memory (not shown), FIFO size input 155 comprises n+1 bits and internal write address 206 comprises n bits, where n bits are sufficient to address memory locations from zero to one less than FIFO size. Write address pointer block 205 comprises five components, write address control 207, multiplexer (i.e., MUX) 208, write address register 209, incrementor 210 and comparator 211. Write address register 209 is a transaction register. Write address control 207 receives push input 110 and the output of comparator 211. Comparator 211 compares the value of FIFO size input 155 to the output of write address register 209 (i.e., write address 206) after it is incremented by incrementor 210. Write address control 207 applies logic to its two inputs to generate two MUX control bits 212, which select as the input to write address register 209 one of zero, the value of write address 206 or that value incremented by one. The selected input is clocked into write address register 209 by write clock 130. The output of write address register 209 is write address 206, which identifies the next memory location to be written. Write address control 207 functions to make write address register 209 a cyclical counter from zero to one less than FIFO size input 155.

Figure 3:
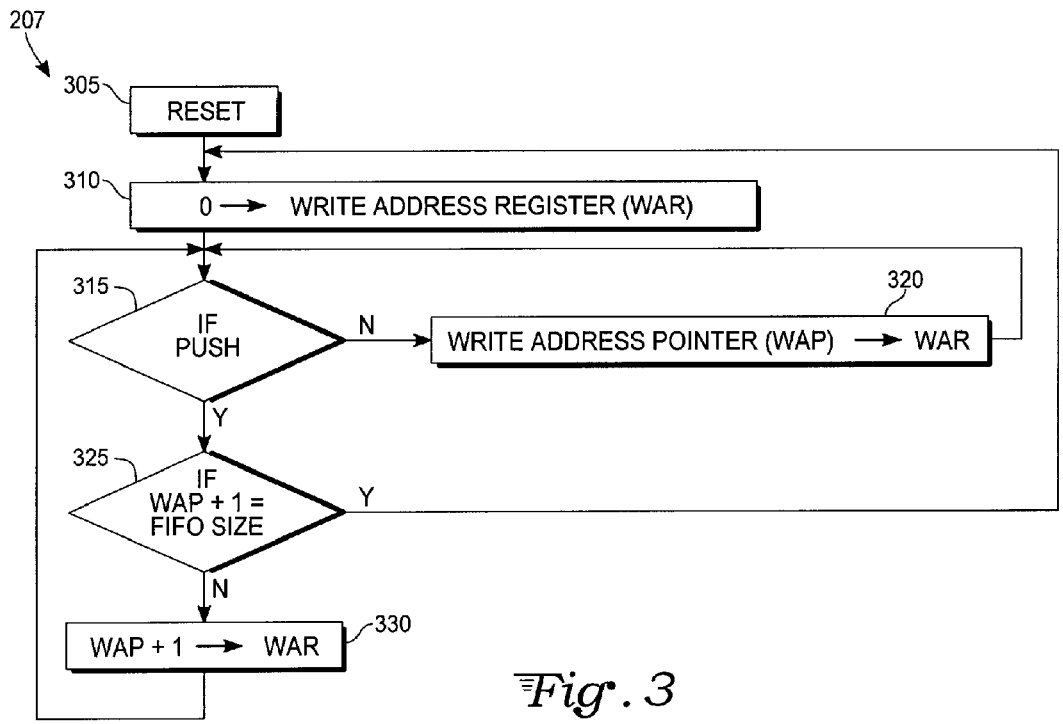
FIG. 3 is a flow chart illustrating an exemplary implementation of write address control shown in FIG. 2A.

An embodiment of the operational logic for write address pointer block 205 and in particular write address control 207 and MUX 208 is illustrated by the flow chart shown in FIG. 3. Upon reset 305, write address register 209 is set to zero by assignment block 310. In other words, referring to FIG. 2, upon reset write address control 207 sets MUX binary control bits 212 to 10 (i.e., decimal 2) so that the value supplied by MUX 208 to the input of write address register 209 will be zero. Following reset, write address control 207 monitors push input 110, as shown in decision block 315. If push input 110 is not asserted then write address register 209 is left unchanged by assignment block 320, which assigns the output of write address register 209 (i.e., write address 206) to its input. In other words, referring to FIG. 2, write address control 207 sets MUX control bits 212 to 01 (i.e., decimal 1) so that the value supplied by MUX 208 to the input of write address register 209 will be the value of its output (i.e., write address 206). If push input 110 is asserted then decision block 325 queries whether incrementing write address register 209 would equal the value of FIFO size input 155. If it would not then the input to write address register 209 is incremented by assignment block 330 and write address control 207 returns to decision block 315. If it would then the input to write address register 209 is assigned zero by assignment block 310 and write address control 207 returns to decision block 315. In other words, referring to FIG. 2, if incrementing write address register 209 would equal the value of FIFO size input 155 then write address control 207 sets MUX control bits 212 to 10 (i.e., decimal 2) so that the value supplied by MUX 208 to the input of write address register 209 will be zero. Otherwise write address control 207 sets MUX control bits 212 to 00 (i.e., decimal zero) so that incrementor 210 increments write address register 209.

With reference to FIG. 2B, a standard read address pointer block 225 receives and utilizes, with reference to FIG. 1, pop input 105, read clock 125 and FIFO size input 155 to generate internal read address 226. Assuming there are a maximum of $2^n$ addressable memory locations in FIFO memory (not shown), FIFO size input 155 comprises n+1 bits and internal read address 226 comprises n bits, where n bits are sufficient to address memory locations from zero to one less than FIFO size. Read address pointer block 225 comprises five components, read address control 227, multiplexer (i.e., MUX) 228, read address register 229, incrementor 230 and comparator 231. Read address register 229 is a transaction register. Read address control 227 receives pop input 105 and the output of comparator 231. Comparator 231 compares the value of FIFO size input 155 to the output of read address register 229 (i.e., read address 226) after it is incremented by incrementor 230. Read address control 227 applies logic to its two inputs to generate two MUX control bits 232, which select as the input to read address register 229 one of zero, the value of read address 226 or that value incremented by one. The selected input is clocked into read address register 229 by read clock 125. The output of read address register 229 is read address 226, which identifies the next memory location to be written. Read address control 227 functions to make read address register 229 a cyclical counter from zero to one less than FIFO size input 155.

Figure 4:
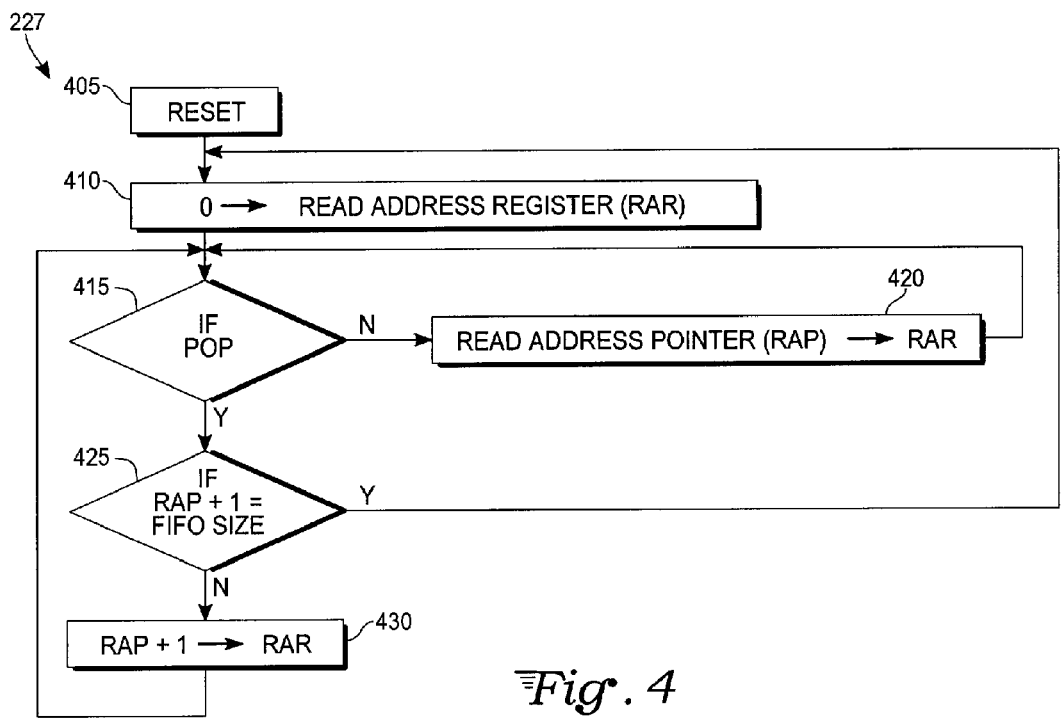
FIG. 4 is a flow chart illustrating an exemplary implementation of read address control shown in FIG. 2B.

An embodiment of the operational logic for read address pointer block 225 and in particular read address control 227 and MUX 228 is illustrated by the flow chart shown in FIG. 4. Upon reset 405, read address register 229 is set to zero by assignment block 410. In other words, referring to FIG. 2, upon reset read address control 227 sets MUX binary control bits 232 to 10 (i.e., decimal 2) so that the value supplied by MUX 228 to the input of read address register 229 will be zero. Following reset, read address control 227 monitors pop input 105, as shown in decision block 415. If pop input 115 is not asserted then read address register 229 is left unchanged by assignment block 420, which assigns the output of read address register 229 (i.e., read address 226) to its input. In other words, referring to FIG. 2, read address control 227 sets MUX control bits 232 to 01 (i.e., decimal 1) so that the value supplied by MUX 228 to the input of read address register 229 will be the value of its output (i.e., read address pointer 226). If pop input 105 is asserted then decision block 425 queries whether incrementing read address register 229 would equal the value of FIFO size input 155. If it would not then the input to read address register 229 is incremented by assignment block 430 and read address control 227 returns to decision block 415. If it would then the input to read address register 229 is assigned zero by assignment block 410 and read address control 227 returns to decision block 415. In other words, referring to FIG. 2, if incrementing read address register 229 would equal the value of FIFO size input 155 then read address control 227 sets MUX control bits 232 to 10 (i.e., decimal 2) so that the value supplied by MUX 228 to the input of read address register 229 will be zero. Otherwise read address control 227 sets MUX control bits 232 to 00 (i.e., decimal zero) so that incrementor 230 increments read address register 229.

With reference to FIG. 2C, multi-synchronous block 245 operates in parallel with read address pointer block 225 and write address pointer block 205. Multi-synchronous block 245 receives, with reference to FIG. 1, pop input 105, push input 110, read clock 125, write clock 130 and FIFO size input 155. Multi-synchronous block 245 generates output #items 135 and output #slots 140 for use by external circuit (not shown) to determine whether and to what extent information may be read from and written to FIFO 100. The purpose of multi-synchronous block 245 is to determine the state of FIFO 100 by comparing status information from each time domain. Assuming there are a maximum of $2^n$ addressable memory locations in FIFO memory (not shown), FIFO size input 155, output #items 135 and output #slots 140 each comprise n+1 bits. Multi-synchronous block 245 is divided into a write domain and a read domain. In write domain 250, which is synchronized by write clock 130, write counter 251 maintains a count of push transactions by incrementing once during each cycle of write clock 130 in which push 110 is asserted. Write counter 251 counts from zero up to one less than $2^{(n+1)}$ before returning to zero to count up again. In read domain 270, which is synchronized by read clock 125, read counter 271 maintains a count of pop transactions by incrementing once during each cycle of read clock 115 in which pop 105 is asserted. Read counter 271 counts from zero up to one less than $2^{(n+1)}$ before returning to zero to count up again. Passing write counter 251 and read counter 271 between time domains is necessary to determine #items 135 and output #slots 140.

Write domain 250 comprises components write counter 251, push MUX 252, push incrementor 253, binary-to-Gray code (i.e., B2G) encoder 254, transport write register 255, synchronizer 256, Gray code-to-Binary (i.e., G2B) decoder 257 and slot calculator 258. Upon reset, write counter 251 is set to zero. Write counter 251 is clocked by write clock 130. Write clock 251 is incremented once for each cycle of write clock 130 in which push input 110 is asserted. To accomplish this, push input 110 controls push MUX 252. If push input 110 is not asserted (e.g., zero in this embodiment), then push MUX 252 leaves write counter 251 unchanged by providing its output to its input. If push input 110 is asserted, then push MUX 252 increments write counter 251 by selecting the output of push incrementor 253 as the input of write counter 251.

The input to write counter 251, i.e., push count 259, which reflects the current push count before write counter 251 does, is ported to read domain 270 through a series of components. First, B2G encoder 254 converts write count 259 from binary to Gray code, resulting in encoded write count 260. The B2G encoder 254 is combinational circuitry and its output must be registered before being ported across a clock domain. The encoded write count 260 is registered using the transport write register 255, which is clocked by write clock 130. Registering occurs long after the B2G circuit's output has become stable, and so the registered value changes in at most one bit position. Next, synchronizer 256, constructed from two flip-flops in series and both clocked by the receive-side clock, synchronizes encoded write count 260 with read domain 270.

The output of synchronizer 256 is synchronized encoded write count 261, which is provided to read domain 270. Similarly, write domain 250 receives from read domain 270 synchronized encoded read count 281. G2B decoder 257 within write domain 250 decodes this signal into synchronized read count 262 for use in slot calculator 258.

Read domain 270 comprises components read counter 271, pop MUX 272, pop incrementor 273, binary-to-Gray code (i.e., B2G) encoder 274, transport read register 275, synchronizer 276, Gray code-to-Binary (i.e., G2B) decoder 277 and item calculator 278. Upon reset, read counter 271 is set to zero. Read counter 271 is clocked by read clock 125. Read clock 271 is incremented once for each cycle of read clock 125 in which pop input 105 is asserted. To accomplish this, pop input 105 controls pop MUX 272. If pop input 105 is not asserted (e.g., zero in this embodiment), then pop MUX 272 leaves read counter 271 unchanged by providing its output to its input. If pop input 105 is asserted, then pop MUX 272 increments read counter 271 by selecting the output of pop incrementor 273 as the input of read counter 271. The input to read counter 271, i.e., pop count 279, which reflects the current push count before read counter 271 does, is ported to write domain 250 through a series of components. First, B2G encoder 274 converts read count 279 from binary to Gray code, resulting in encoded read count 280. Since the B2G encoded 274 is a combinational circuit, its output must be registered before being ported across a clock domain. The encoded read count 280 is registered using the transport read register 275, which is clocked by read clock 125. Registering occurs long after the 22G circuit's output has become stable, and so the registered value changes in at most one bit position. Next, synchronizer 276, constructed from two flip-flops in series and both clocked by the receive-side clock, synchronizes encoded read count 280 with write domain 250.

The output of synchronizer 276 is synchronized encoded read count 281, which is provided to write domain 250. Similarly, read domain 270 receives from write domain 250 synchronized encoded write count 261. G2B decoder 277 within read domain 270 decodes this signal into synchronized write count 282 for use in item calculator 278.

Slot calculator 258 calculates output #slots 140. Inputs to slot calculator 258 are FIFO size 155, registered write count 263 and synchronized read count 262. Since the size of FIFO 100 is variable, the calculation of output #slots 140 is dependent upon the value of FIFO size 155. More precisely, output #slots 140 is determined by the calculation shown in Equation 1:

slots=FIFO size−(registered write count−synchronized read count)    Equation 1.

Item calculator 278 calculates output #items 135. Inputs to item calculator 278 are registered read count 283 and synchronized write count 282. Output #items 135 is determined by the calculation shown in Equation 2:

items=synchronized write count−registered read count    Equation 2.

Write counter 251 and read counter 271, as well as registered and synchronized write and read counts 262, 263, 282, 283, are each n+1 bits, which means they can count to twice the maximum number of addressable memory locations in FIFO 100. The added bit is utilized to differentiate between full and empty conditions. Without the extra bit, it would be unknown whether FIFO 100 is full or empty because n-bit counters could be equal, and their comparison zero, in both cases. Thus, when n=3, FIFO 100 would have eight addressable memory locations from decimal zero to decimal seven. Write counter 251 and read counter 271 would be four bits, counting from decimal zero to decimal 15 and cycling back to zero to count up again. If the value of FIFO size input 155 is eight, i.e., the maximum addressable memory locations in FIFO 100, a comparison of write counter 251 to read counter 271 or synchronized write count 282 to registered read count 283 or registered write count 263 to synchronized read count 262, will always yield a decimal eight when FIFO 100 is full and zero when it is empty. Thus, assuming n=3 with a maximum number of eight addressable memory locations and the value of FIFO size 155 is eight, output #items 135, per equation 2, will be eight, i.e., the difference between the number of pushes and pops. In contrast, output #slots 140, per equation 1, will be zero. A two's complement method of subtraction will always yield a correct unsigned binary result. As previously mentioned, external circuitry (not shown), must monitor output #slots 140 and output #items 135 to avoid overwriting and overreading FIFO 100.

Figure 5:
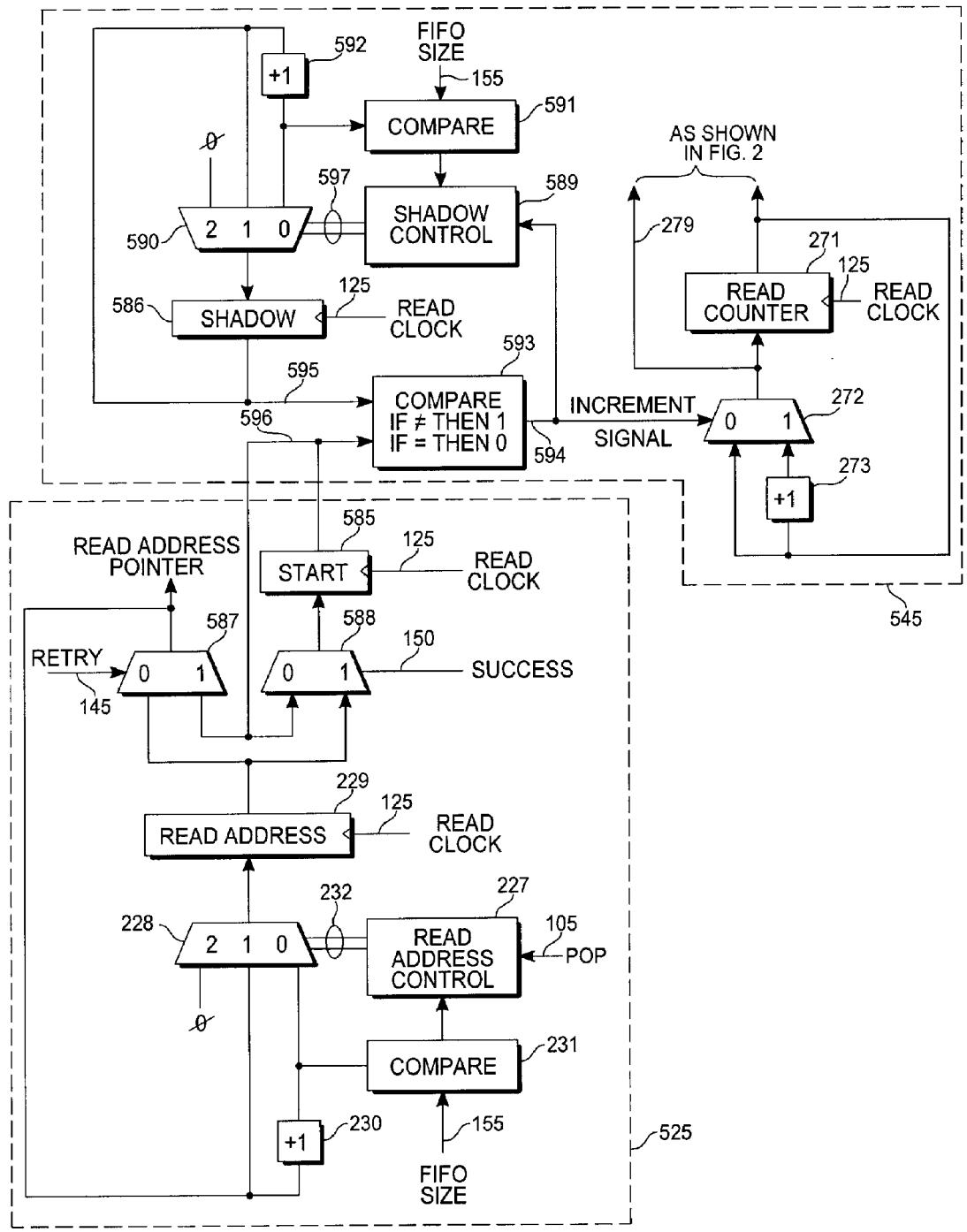
FIG. 5 is a block diagram showing an exemplary combined implementation of programmable size and read retry embodiments of the present invention.

FIG. 5 is a block diagram showing an exemplary combined implementation of programmable size and read retry embodiments of the present invention. Although FIG. 5 illustrates only read retry, similar functionality could be added in the write domain to implement write retry. As illustrated by the embodiment shown in FIG. 5, read retry functionality modifies, with reference to FIGS. 2B-C, read address pointer block 225 and the control input of pop MUX 272 within multi-synchronous block 245. The modified read address pointer block 225 and multi-synchronous block 245 will be discussed with reference to read address pointer block 525 and multi-synchronous block 545 shown in FIG. 5. As indicated in FIG. 5, other functionality shown in FIGS. 2A-C remains the same and is not repeated in FIG. 5 for purposes of clarity.

In the embodiment shown in FIG. 5, read retry capability is implemented using start register 585 and shadow register 58G operating in addition to read address register 229. Like read address register 229, start register 585 and shadow register 586 are each n bits, assuming the maximum number of addressable memory locations in FIFO 100 is $2^n$. Like read address register 229, start register 585 and shadow register 586 store addresses for memory locations. Start register 585 stores the starting address for each pop transaction asserted on pop input 105, wherein each transaction may consist of one or more pops. As is the case in the embodiment shown in FIGS. 2A-C, read address register 229 increments for each pop during a transaction of one or more pops asserted on pop input 105. However, unlike the embodiment shown in FIGS. 2A-C, read address register 229 may be restored to its starting address. One or the other of success input 150 and retry input 145 must be asserted at the end of each transaction. When success input 150 is asserted the value in read address register 229 is latched into start register 585. When retry input 145 is asserted the value in start register 585 is latched into read address register 229. Only when success input 150 is asserted following a transaction is start register 585 updated to read address register 229. In some embodiments, the maximum size of a transaction may be the value of FIFO size input 155 less one, which is enforced by external circuitry (not shown). In this embodiment, only after start register 585 is updated following an indication of success are shadow register 586 and read counter 271 incremented one or more times until the value stored in shadow register 586 is equal to the value stored in start register 585. While delaying incrementation of read counter 271 until the transaction is indicated to be successful may cause read counter 271 to temporarily lag behind, this method ensures that read counter 271 is not incremented unless a pop transaction was successful. This is important in embodiments where pops and pushes occur simultaneously because it avoids overwriting memory locations that may need to be read again if the transaction fails. Secondly, the fact that the read counter 271 is incremented by 1 per cycle at most ensures that the counter value can be ported correctly across clock domains.

Retry input 145 and success input 150 are asserted by external circuitry (not shown) to request transaction retry or indicate a successful transaction, respectively. Retry input 145 and success input 150 are synchronized with read clock 125. External circuitry may assert pop input 105 one or more times (i.e., over one or more cycles of read clock 125) to read information stored in one or more memory locations in FIFO 100. If the read transaction fails for some reason, the external circuitry may assert retry input 145 for one clock cycle. Assertion of retry input 145 restores the read-side of FIFO 100 to the state that existed immediately prior to the start of the failed transaction. Simultaneous assertion of retry input 145 and pop input 105 allows the failed transaction to retry in the same cycle of read clock 125. If a read transaction was successful, the external circuitry asserts success input 150 for one cycle of read clock 125. Simultaneous assertion of success input 150 and pop input 105 allows a new transaction to begin in the same cycle of read clock 125. Thus, back-to-back successful and retried transactions can be performed by FIFO 100 without lost cycles. External circuitry may turn transaction retry capability off by asserting success input 150 and deasserting retry input 145. This allows external circuitry to statically or dynamically program transaction retry capability. When transaction retry capability is in use, external circuitry is responsible for assuring that both retry input 145 and success input 150 are never asserted simultaneously. The net result is that transactions of various sizes can be retried without loss of data or corruption of FIFO state even though pop and push domains are different.

FIG. 5, with reference to FIGS. 1, 2, and 4, will now be discussed in greater detail. Read address pointer block 525 receives and utilizes, with reference to FIG. 1, pop input 105, read clock 125, retry input 145, success input 150 and FIFO size input 155, to generate internal read address pointer 526. Assuming there are a maximum of $2^n$ addressable memory locations in FIFO memory (not shown), FIFO size input 155 comprises n+1 bits and internal read address pointer 526 comprises n bits, where n bits are sufficient to address memory locations from zero to one less than FIFO size. Read address pointer block 525 comprises eight components, read address control 227, read MUX 228, read address register 229, incrementor 230, comparator 231, retry MUX 587, success MUX 588 and start register 585. Read address control 227 receives pop input 105 and the output of comparator 231.

During read transactions, retry input 145 will control retry MUX 587 to couple the output of read address register 229 to read address pointer 526. During a transaction following a successful transaction, retry input 145 will not be asserted by external circuitry (not shown), which means retry MUX 587 will couple read address pointer 526 to the output of read address register 229. Unless retry input 145 is asserted, read address register 229 and read address pointer 526 function the same as they do in the embodiment shown in FIGS. 2A-C. Comparator 231 compares the value of FIFO size input 155 to read address pointer 526 after it is incremented by incrementor 230. The results of the comparison are used by read address control 227 to control MUX 228. Read address control 227 applies logic to its two inputs to generate two MUX control bits 232, which select as the input to read address register 229 one of zero, the value of read address pointer 526 or the value of read address pointer 526 incremented by one. The selected input is clocked into read address register 229 by read clock 125. Read address pointer 526, which points to the next memory location to be written, will be the output of read address register 229 unless and until retry input 145 is asserted, which will make read address pointer 526 the output of start register 585. At the end of each successful transaction, external circuitry (not shown) updates start address register 585 by asserting success input 150, which controls success MUX 588, to couple the output of read address register 229 to the input of start address register 585 until clocked in by read clock 125. During a transaction, success input 150 is not asserted by the external circuitry. Thus, during a transaction, which may comprise one or more pops, start address register 585 maintains the starting address because deasserted success input 150 causes success MUX 588 to provide the output of start address register 585 to its input. If a transaction fails, the external circuitry will assert retry input 145 to restore read address pointer 526 and read address register 229 to the transaction starting address. When retry input 145 is asserted, it causes retry MUX 587 to couple read address pointer 526 to the output of start address register 585, which is passed to the input of read address register 229 by read address control 227. An embodiment of the operational logic for read address control 227 and MUX 228 is illustrated by the flow chart shown in FIG. 4, which remains unchanged for this embodiment. A simultaneous assertion of pop input 105 and retry input 145 is accomplished by external circuitry asserting retry input 145 for one cycle of read clock 125. This holds read address pointer 526 at the transaction starting address stored in start address register 585 while read address control 227 increments the starting address by one before applying it to the input of read address register 229, which will be clocked in on the next cycle of read clock 125, at which time retry input 145 will have been deasserted causing retry MUX 587 to couple read address pointer 526 to the incremented output of read address register 229.

Multi-synchronous block 545 is modified relative to multi-synchronous block 245 to control incrementation of read counter 271 based on assertion of retry input 145 and success input 150. In the embodiment illustrated by multi-synchronous block 545, read counter 271 is not incremented by each pop during transactions. Instead, it is incremented after assertion of success input 150. This avoids having to reset read counter 271 upon assertion of retry input 145 and avoids the risk of overwriting memory locations that would need to be re-read during a retry transaction. Also, incrementing at most one per cycle ensures that the counter value can be ported correctly across clock domains. Incrementation is controlled by six components, including shadow register 586, shadow control 589, shadow MUX 590, shadow comparator 591, shadow incrementor 592 and incrementation comparator 593. Generally, these components operate to increment shadow register 586 to the value stored by start register 585, which, in turn, increments read counter 271. As previously discussed, start register 585 will not be updated to read address register 229 until assertion of success input 150. While start register 585 is updated in one cycle of read clock 125, shadow register 586 is incrementally updated once each clock cycle. During clock cycles when shadow register 586 is incremented, read counter 271 is also incremented by incrementation signal 594. Read counter 271 is incrementally updated to ensure that Gray coding operates to change only one bit at a time.

Shadow register 586 receives as an input one of zero, shadow address 595 or shadow address 595 incremented by one. One of these three inputs is selected by shadow control 589, which receives incrementation signal 594 and the output of comparator 591. Comparator 591 compares the value of FIFO size input 155 to the value of shadow register 586 (i.e., shadow address 595) after it is incremented by incrementor 592. Shadow control 589 applies logic to its two inputs to generate two MUX control bits 597, which select as the input to shadow register 586 one of zero, the value of shadow address 595 or the value of shadow address 595 incremented by one. The selected input is clocked into shadow register 586 by read clock 125. The output of shadow register 586 is shadow address 595. Incrementation comparator 593 compares shadow address 595 to start address 596. If they are not equal, incrementation comparator asserts incrementation signal 594. Incrementation signal 594 causes MUX 272 to increment read counter 271 and causes shadow control 589 and shadow MUX 590 to increment shadow register 586.

Figure 6:
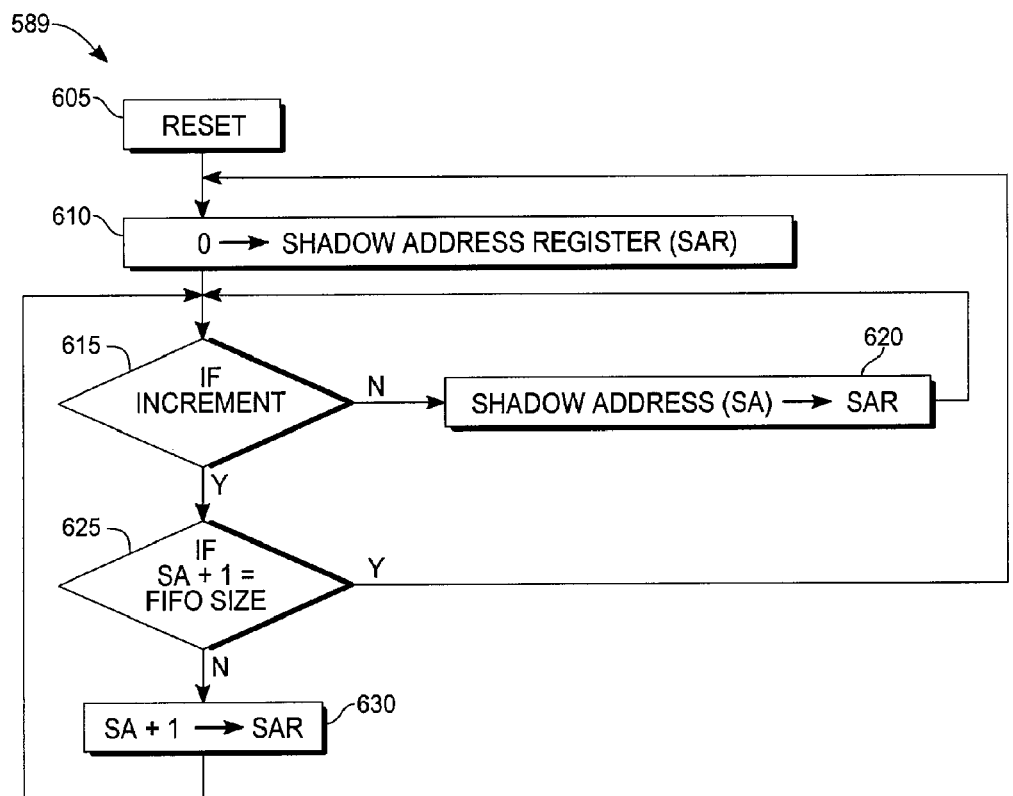
FIG. 6 is a flow chart illustrating an exemplary implementation of retry control shown in FIG. 5.

An embodiment of the operational logic for shadow control 589 and shadow MUX 590 is illustrated by the flow chart shown in FIG. 6. Upon reset 605, shadow register 586 is set to zero by assignment block 610. In other words, referring to FIG. 5, upon reset shadow control 589 sets MUX binary control bits 297 to 10 (i.e., decimal 2) so that the value supplied by shadow MUX 590 to the input of shadow register 586 will be zero. Following reset, shadow control 589 monitors the output of incrementation comparator 593 (i.e., incrementation signal 594), as shown in decision block 615. If shadow address 595 is not equal to start address 596 then incrementation comparator 593 will assert incrementation signal 594. If they are equal, incrementation signal is not asserted. If incrementation signal 594 is not asserted then shadow register 586 is left unchanged by assignment block 620, which assigns the output of shadow register 586 (i.e., shadow address 595) to its input. In other words, referring to FIG. 5, shadow control 589 sets shadow MUX control bits 597 to 01 (i.e., decimal 1) so that the value supplied by shadow MUX 590 to the input of shadow register 586 will be the value of its output (i.e., shadow address 595). If incrementation signal 594 is asserted then decision block 625 queries whether incrementing shadow address 594 would equal the value of FIFO size input 155. If it would not then the input to shadow register 586 is incremented by assignment block 630 and shadow control 589 returns to decision block 615. If it would then the input to shadow register 586 is incremented to zero by assignment block 610 and shadow control 589 returns to decision block 615. In other words, referring to FIG. 5, if incrementing shadow address 595 would equal the value of FIFO size input 155 then shadow control 589 sets shadow MUX control bits 597 to 10 (i.e., decimal 2) so that the value supplied by shadow MUX 589 to the input of shadow register 586 will be zero. Otherwise shadow control 589 sets shadow MUX control bits 597 to 00 (i.e., decimal zero) so that incrementor 592 increments shadow register 586.

The functionality of the embodiment may be further described by an example. If the maximum number of addressable memory locations of FIFO 100 was eight (i.e., $2^n$ locations where n=3), the number of bits in each of read counter 271, write counter 251, FIFO size input 155 is four bits (i.e. n+1 bits), and the number of bits in each of read address register 229, write address register 209, start register 585 and shadow register 586 is three bits (i.e., n bits). Read counter 271 and write counter 251 each count from zero to 15 before returning to zero in a cyclical count regardless of the value of FIFO size input 155. If the value of FIFO size input 155 is six, the maximum transaction size, in some embodiments, is five pops or five pushes. Based on the value of six set by FIFO size input 155, read address register 229, write address register 209 and shadow register 586 each count from zero to five in increments of one before returning to zero in a cyclical count unless a retry latches a start address into read address register 209. Start register 585 does not incrementally count and, instead, latches the address stored in read address register 229 upon indications of successful transactions. If seventeen writes (i.e., pushes) and eleven reads (i.e., pops) had been successfully performed after reset by external circuitry (not shown), then the memory location address stored in write address register 209 would be five and the memory location address stored in read address register 229 would also be five, whereas the count stored in write counter 251 would be one while the count stored in read counter 271 would be eleven. Equation 1, using two's complement subtraction, provides through output #slots 140 that there are zero slots available (i.e., FIFO 100 is full based on the value of FIFO size input 155). Equation 2, again using two's complement subtraction, provides through output #items 135 that there are six items available to be read from FIFO 100 (i.e., FIFO 100 is full based on the value of FIFO size input 155).

All functionality described herein may be implemented in a discrete FIFO memory device or within any integrated device, including but not limited to an ASIC (i.e., "Application-Specific Integrated Circuit"). Embodiments of the invention may be designed, simulated and synthesized into circuitry, for example, by defining the functionality in any HDL (i.e., "Hardware Description Language") application and using the hardware description output of that application in any circuitry fabrication process well known to those of ordinary skill in the art.

The present invention advantageously provides flexibility for numerous implementations of a generic multi-synchronous FIFO. FIFO size can be programmed incrementally up to the maximum number of addressable memory locations of the FIFO. The same Gray code encoder and decoder operate on the range of FIFO sizes. Transactions may be retried without loss of information or corruption of FIFO state even though push and pop clock domains are asynchronous. Retried transactions may be started in the same cycle in which retry is asserted and subsequent transactions may be started in the same cycle in which success is asserted for the previous transaction. Back to back successful and retried transactions can be performed without delays. Retry capability may be turned on or off.

The foregoing descriptions of specific embodiments of the present invention have been presented for purposes of illustration and description, not limitation. They are not intended to be exhaustive or to limit the invention to the precise forms disclosed. It is intended that the scope of the invention be defined by the claims appended hereto and their equivalents.

What is claimed is:

1. A multi-synchronous first in first out memory, comprising:
   a memory having a selectable number of addressable memory locations for storing information, the selectable number of addressable memory locations being a programmable size of the first in first out memory specifiable in increments of one addressable memory location up to a maximum number of addressable memory locations;
   read control means synchronized by a read clock for controlling pop transactions configured to read from one or more of the memory locations using a read address that is cyclical to the programmable size;
   write control means synchronized by a write clock asynchronous to the read clock for controlling push transactions configured to write to one or more of the memory locations using a write address that is cyclical to the programmable size;
   selectable transaction retry control means configured to cause the read control means to repeat selected pop transactions and/or cause the write control means to repeat selected push transactions; and
   a transaction register storing the next addressable memory location and a start register storing the starting address for a transaction, wherein retrying the transaction in the same clock cycle in which the retry signal is asserted causes the transaction register to latch the next addressable memory location after the starting address instead of the starting address, the selectable transaction retry control means being enabled, or initiated and stopped, without impacting original read or write status of the first in first out memory.

2. The multi-synchronous first in first out memory of claim 1, further comprising:
   a status indicator determined by synchronized signals from the read clock domain and write clock domain.

3. The multi-synchronous first in first out memory of claim 2, wherein the status indicator indicates how many of the selectable number of addressable memory locations are available to store information.

4. The multi-synchronous first in first out memory of claim 2, wherein the status indicator is produced in the write clock domain.

5. The multi-synchronous first in first out memory of claim 2, wherein the status indicator is configured to update after assertion of a success signal upon completion of a transaction.

6. The multi-synchronous first in first out memory of claim 5, wherein the status indicator is configured to update incrementally.

7. The multi-synchronous first in first out memory of claim 5, wherein a subsequent transaction can begin in the same clock cycle in which the success signal is asserted to indicate the previous transaction was successful.

8. The multi-synchronous first in first out memory of claim 1, wherein the selectable number of memory rows is dynamically variable.

9. The multi-synchronous first in first out memory of claim 1, wherein transaction retry is selected by assertion of a retry signal.

10. The multi-synchronous first in first out memory of claim 9, wherein the retry signal is a retry pop transaction signal.

11. The multi-synchronous first in first out memory of claim 9, wherein the transaction can be retried in the same clock cycle in which the retry signal is asserted.

12. The multi-synchronous first in first out memory of claim 1, wherein the selectable transaction retry control means is initiated by assertion of a retry signal and stopped by assertion of a success signal, stopping of the retry control means enabling a continuation of a previous read or write operation.

13. The multi-synchronous first in first out memory of claim 1, wherein the selectable transaction retry is configured to be disabled during assertion of a success signal.

14. A method of retrying a transaction in a multi-Synchronous size-programmable first in first out memory, comprising the steps of:
   inputting a programmable size of the first in first out memory as a selected number of addressable memory locations specifiable in increments of one addressable memory location up to a maximum number of addressable memory locations of the first in first out memory;
   receiving a transaction request;
   storing a next addressable memory location in a transaction register and a starting address of a transaction in a start register;
   executing the transaction;

incrementing the starting address in the transaction register after comparing the incremented address to the programmable size;

asserting a retry request; and retrying the transaction, including beginning the retry transaction using the start address stored in the start register and latching the start address incremented by one into the transaction register, whereby retrying the transaction in the same clock cycle in which the retry request is asserted causes the transaction register to latch the next addressable memory location after the starting address instead of the starting address;

wherein the transaction register uses a read address or a write address, according to the transaction, that is cyclical to the programmable size.

15. The method of claim 14, further comprising:

updating a status indicator after receiving an indication the transaction was successful.

16. The method of claim 15, wherein the status indicator is updated incrementally.

17. The method of claim 14, wherein the transaction request is a pop request.

18. The method of claim 14, further comprising:

disabling the method of retrying a transaction by asserting a success signal.

19. A multi-synchronous first in first out (FIFO) buffer, comprising:

a readable and writable memory having a specified number of addressable locations;

a FIFO size input that inputs a FIFO size less than or equal to the specified number of addressable locations;

a read address pointer block providing a read address pointer that is cyclical to the FIFO size, based upon a comparison of a read-related address and the FIFO size input, and used in a pop to read from the readable and writable memory;

a write address pointer block providing a write address pointer that is cyclical to the FIFO size, based upon a comparison of a write-related address and the FIFO size input and used in a push to write to the readable and writable memory;

a transaction retry control that restores the read address pointer block or the write address pointer block to a state existing prior to a start of a failed transaction; and a transaction register storing the next addressable memory location and a start register storing the starting address for a transaction, wherein retrying the transaction in the same clock cycle in which the retry signal is asserted causes the transaction register to latch the next addressable memory location after the starting address instead of the starting address.

* * * * *